March 27, 1934. M. SHOELD 1,952,099
APPARATUS FOR TREATING LIQUIDS
Filed Aug. 17, 1929 7 Sheets-Sheet 4

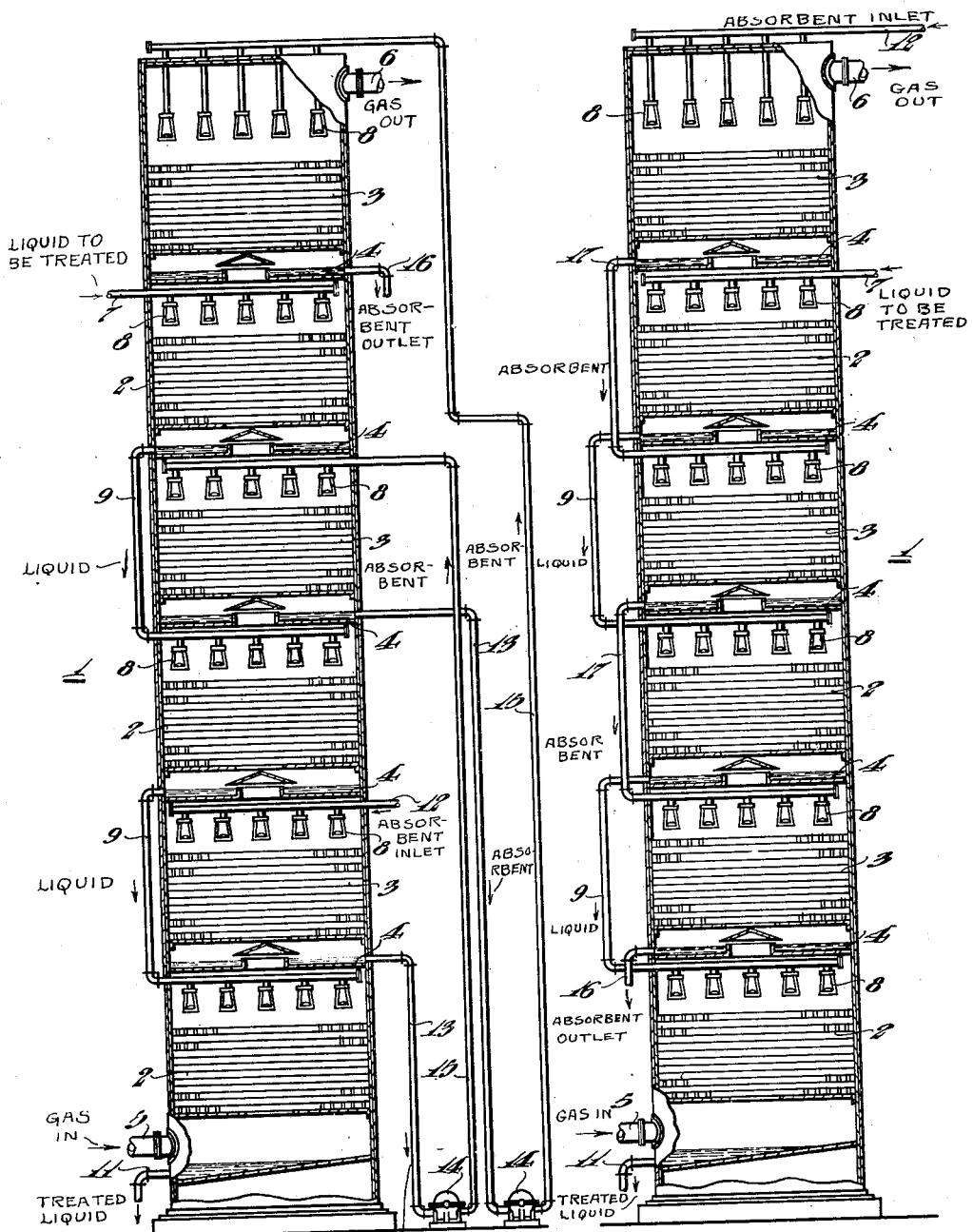

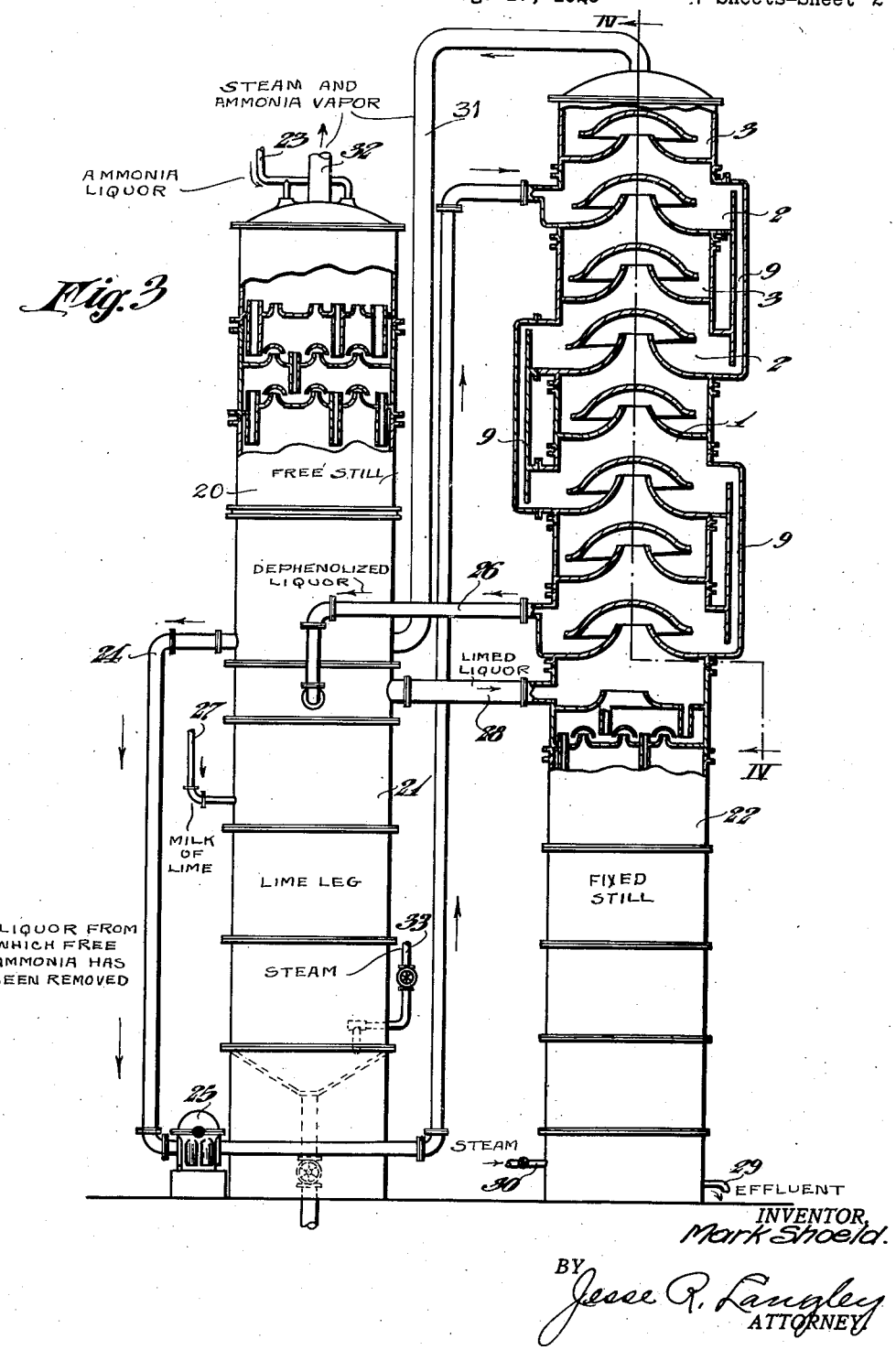

INVENTOR.
Mark Shoeld.
BY Jesse R. Langley
ATTORNEY.

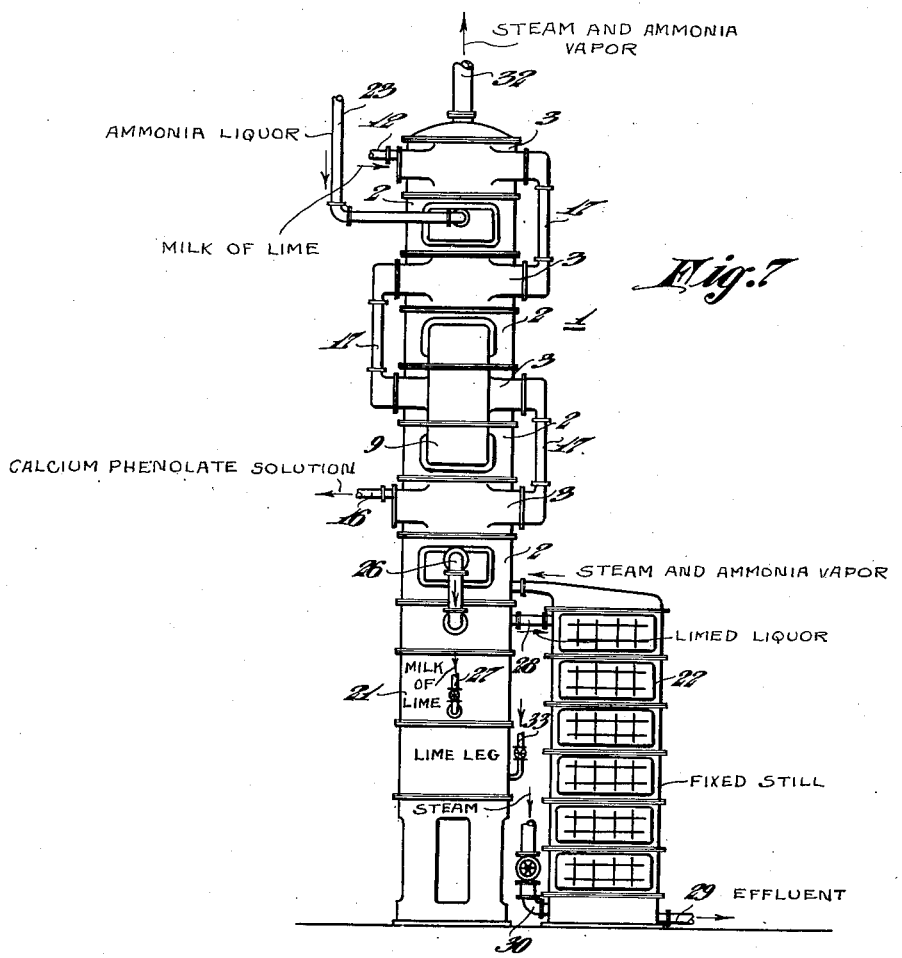

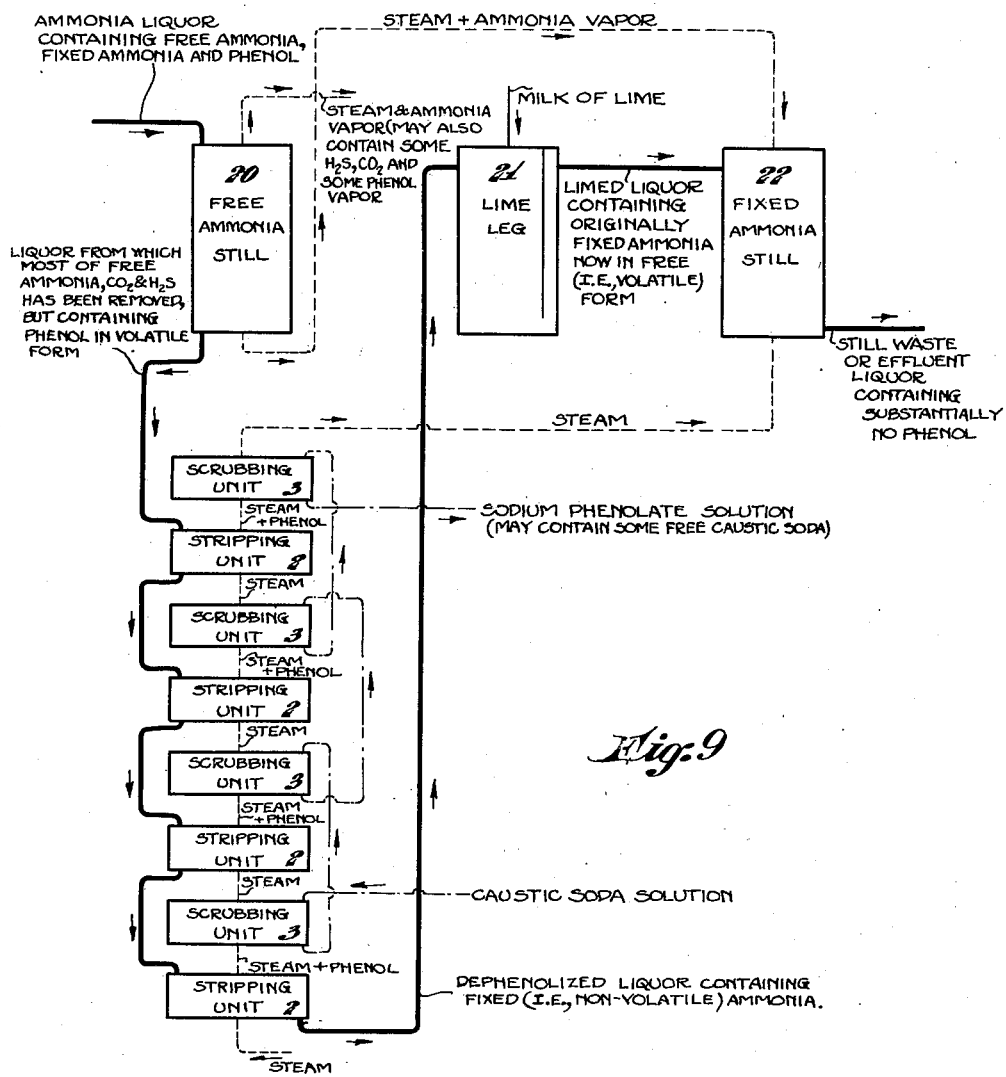

Patented Mar. 27, 1934

1,952,099

UNITED STATES PATENT OFFICE 1,952,099

APPARATUS FOR TREATING LIQUIDS

Mark Shoeld, Mount Lebanon Township, Allegheny County, Pa., assignor to The Koppers Company of Delaware, a corporation of Delaware Application August 17, 1929, Serial No. 386,515

3 Claims. (Cl. 261—21)

My invention relates to the treatment of liquids for the separation of constituents thereof or for the removal of volatile impurities. My invention, while it may be applied to a great number of problems, has a particular application to the dephenolization of ammoniacal liquor.

An object of my invention is to provide apparatus for treating liquids for the separation or removal of constituents that shall be of improved efficiency with respect to prior apparatus.

A further object of my invention is to provide an advantageous apparatus for the purification of liquids from impurities by means of a carrier fluid that shall be effective to reduce the amount of carrier fluid required for the removal of a given amount of impurity.

A still further object of my invention is to provide improved apparatus for the purification of liquids from volatile impurities, particularly with respect to the dephenolization of ammoniacal liquor.

My invention is concerned principally with processes in which a carrier fluid such as, for example, another fluid of a gas, is employed for the purpose of removing a constituent or impurity from a liquid and transferring it to an absorption or purification agent of some sort, for example, a solid absorbent or another liquid.

In all such processes it usually happens that the carrier fluid also removes other constituents of the liquid treated than that constituent which it is desired principally to remove. Consequently, an attempt has been made to employ absorbent means for the removal of impurities which do not affect the presence of other constituents in the carrier fluid and to employ the carrier fluid in a closed cycle so that constituents not removed by the absorbent means will tend to saturate the carrier fluid to such an extent that it will no longer extract such constituents from the liquid being treated, and will serve only to remove that constituent whose removal is principally desired.

It may be, for example, that it is desired to remove constituents from an aqueous ammoniacal liquor. It has been shown that the dephenolization of this liquor is best accomplished by maintaining the liquor and the caustic soda solution which serves as an absorbent for the phenol, as well as the recirculating gas which serves as carrier, at a temperature just below the boiling point of the ammoniacal liquor. The function of the caustic soda solution is thus to extract only the phenol from the recirculating gases which said gases have removed from the ammoniacal liquor.

Condensation of steam or ammonia, if the latter be present, does not occur. This consideration is of considerable importance because on the one hand even a small variation in temperature would cause the condensation of considerable amounts of steam and a great increase in cost of carrying out the process and on the other hand the condensation of ammonia in the caustic soda solution employed for dephenolization would be undesirable and would represent a loss of valuable material.

Such processes as have been briefly outlined above are thus seen to consist ordinarily of a closed cycle in which a carrier fluid is recirculated through a stage which may be designated as the "stripping" stage in which the carrier fluid removes the desired constituent from the liquid, and a "scrubbing" stage in which the carrier fluid is in turn treated for the removal of said constituent therefrom.

In one of its aspects, my invention constitutes an improvement upon the process and apparatus described and claimed in the copending application of Joseph A. Shaw, Serial No. 230,570, filed November 2, 1927.

Such processes ordinarily require the recirculation of considerable amounts of carrier fluid even under optimum conditions. In most instances, however, it may be desired to employ a definite and limited flow of carrier fluid whether liquor or gas, and this flow may be insufficient in quantity to accomplish adequate removal of the impurity or constituent desired to be removed.

For example, in the distillation of gas liquor, it may be desired to employ the steam which is normally used for the distillation of said liquor as the dephenolization medium. However, as is well known, prior methods and apparatus have been such that this amount of steam is far below that ordinarily required for distillation of the liquor with the result that the greater part of the phenols pass through the distillation system with the gas liquor and eventually come into contact with the lime or other agent added for the purpose of decomposing fixed ammonia compounds to form calcium phenolates which cannot be removed by steam distillation and pass out in the waste liquor from the still.

My invention contemplates employment of a carrier fluid for the purpose of removing a constituent or impurity from a liquid and involving the treatment of the liquid with said carrier fluid in a series of repeated contacts between each of which contacts said carrier fluid is treated for the removal of the constituent or impurity absorbed from said liquor.

By thus increasing the number of contacts of the carrier fluid or a stream of carrier fluid with the liquid to be treated together with the treatment of the carrier fluid between each of said contacts the quantity of carrier fluid required to effect a given quantity of any constituent or impurity from liquid is materially reduced.

My invention may be applied to the removal of various constituents and impurities from liquids and by means of various carrier fluids, but it is particularly advantageous with respect to the removal of volatile constituents or impurities from liquids by means of a gas, and it finds a particular application to the dephenolization of ammoniacal liquor as aforesaid.

As illustrations of various processes which may be carried out according to the process and in the apparatus of the present invention, I may cite the following:

Non-aqueous liquid such as coal tar from both high temperature coking and low temperature coking operations may be treated for the removal of phenols, the carrier fluid employed being coal gas or steam, and the phenol absorbent being a solution of sodium or potassium hydroxide or milk of lime.

Hydrogen sulfide may be removed from water or oil or other liquid containing it by means of air, steam or gas as a carrier fluid, the absorbent employed being a solution of an alkali such as sodium hydroxide, or a metallic salt solution such as a solution of ferric chloride, or a suspension of metallic compound such as iron oxide in a solution of an alkali such as sodium carbonate. In the case of very volatile oils such as gasoline, the employment of air as a carrier fluid would not ordinarily be desired by reason of the fire hazard involved.

Gasoline and other fractions of petroleum distillation may be "weathered", that is, treated for the removal of extremely volatile petroleum distillates according to the present process, the carrier fluid being steam or gas, and the absorbent being, for example, a wash oil having a greater affinity for the lighter distillates than the gasoline or other material from which they are to be removed.

Hydrogen cyanide may also be removed from the liquid containing it in volatile form according to the present process by means of a current of gas or of steam, and the absorbent employed may be similar to that employed for the removal of hydrogen sulphide, as hereinabove recited, or may constitute a suspension of sulphur in an alkaline solution.

In order that my invention may be fully set forth and understood, I now describe with reference to the accompanying drawings, which illustrate a number of its specific embodiments, the preferred manner in which it is accomplished and carried out but without limiting myself to such illustrative examples.

In these drawings,

Figure 1 is a vertical sectional view of apparatus for accomplishing the removal and recovery of a volatile constituent of a liquid by means of a stream of gas;

Fig. 2 is a similar view of apparatus employed for the same purpose as that shown in Fig. 1, but differing somewhat in the relative arrangement of its several parts, as will be hereinafter shown;

Fig. 3 is an elevational view of an ammonia still for the distillation of gas liquor provided with apparatus for additionally accomplishing the dephenolization of the liquor in accordance with the present invention;

Figs. 7 and 8 are elevational views similar to Fig. 5 of various forms and arrangements of ammonia stills provided with apparatus for accomplishing the objects of the presents invention; and Fig. 9 is a flow diagram of a process employed in the apparatus shown in Figs. 3 and 4.

Similar numerals designate similar parts in each of the several views of the drawings.

Figure 4:
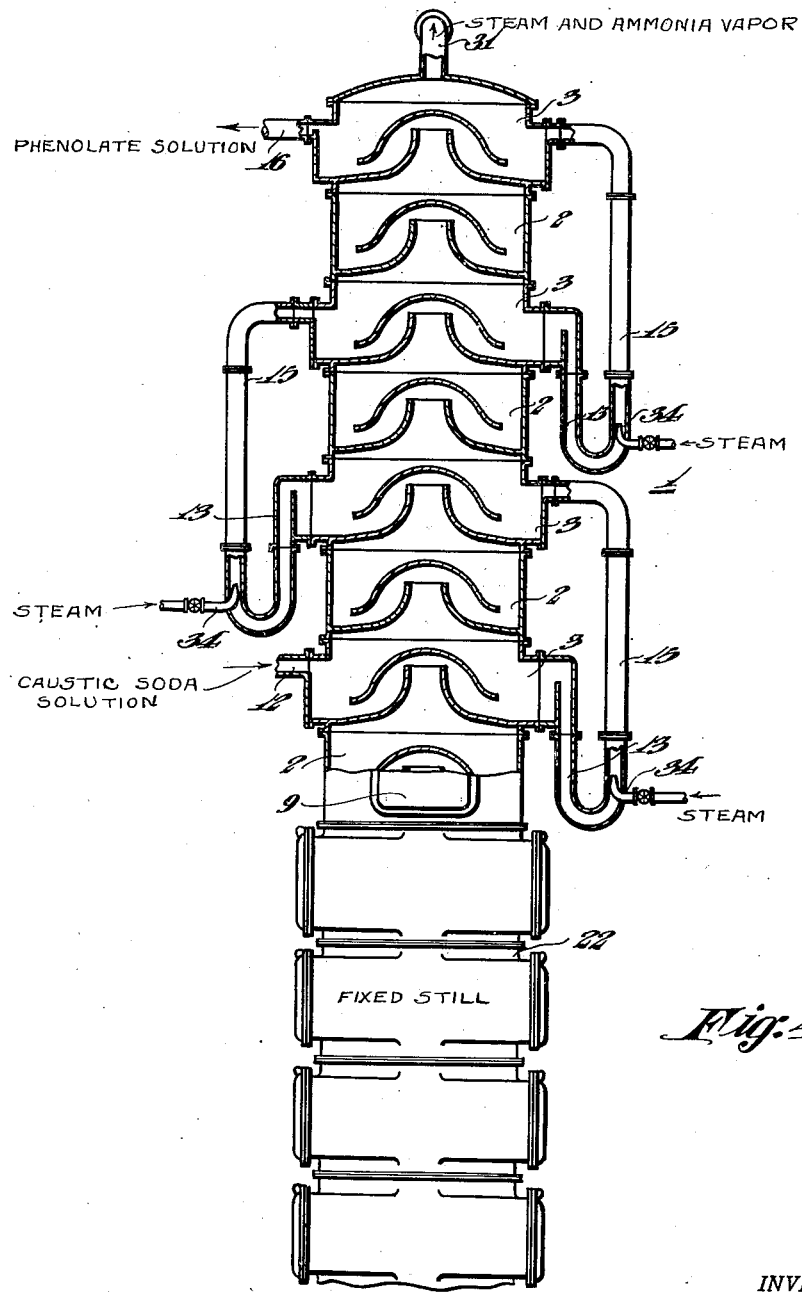
Fig. 4 is a view, partly in elevation and partly in vertical section, taken on the line IV—IV of Fig. 3.

In Fig. 1 there is illustrated, as simply as possible, the principle of the present invention. In this instance the apparatus consists of a tower indicated generally by the character of reference 1. The tower is divided into a plurality of alternately disposed stripping sections 2 and scrubbing sections 3 separated by appropriate partitions 4 designed to allow the free passage of gas from one section to the other while preventing the flow of liquid. The tower is provided with a gas inlet 5 in the lower portion thereof and an outlet 6 in the upper portion thereof whereby a stream of gas under appropriate pressure is passed in an upward direction through the tower 1, thereby traversing the plurality of sections 2 and 3.

The stripping sections 2 and scrubbing sections 3 are so disposed with respect to the path of the gas passing through the tower 1 that each of said stripping sections 2 is followed by a scrubbing section 3. The liquid to be treated is introduced in this instance to the uppermost stripping section 3 through a conduit 7 and appropriate sprays or other distributing devices 8 and passes downward through the stripping section 2 in contact with the current of gas.

The liquid then accumulating in the recess provided by the partition 4 passes through a conduit 9 and is distributed by a second group of sprays 8 throughout the interior of the next lowest stripping section 2. After passing through this section it then passes out through a similar conduit 9 into the lowest stripping section 2 as before and upon reaching the bottom of the tower 1 passes out through a drain 11.

In the present instance an absorbent liquid of appropriate nature is employed in the scrubbing sections 3 and, as shown in Fig. 1, is caused to pass through said scrubbing sections 3 in a series which is countercurrent with respect to the series followed by the liquid being treated and passing through the stripping sections 2. The absorbent liquid is introduced by means of a pipe 12 and sprays 8 into the lowest scrubbing section 3 and after passing through this section is conveyed by a conduit 13, a pump 14 or equivalent device, a conduit 15 and sprays 8 to the next highest scrubbing section 3. After the liquid passes through this section it is again pumped as before to the next highest scrubbing section 3 from which it is taken off by means of a drain 16.

It will thus be seen that the liquid being treated passes through a plurality of stages in a series countercurrent to the flow of the carrier gas and the absorbent liquid passes through a like plurality of stages situated countercurrently with respect to the flow of the carrier gas. The gas entering the system initially traverses first the liquid already treated a number of times and then the freshest absorbent liquid, and finally passes through the stage in which the liquid to be treated is first introduced and then the stage in which the absorbent liquid is last used. This countercurrent arrangement is particularly advantageous when a non-recirculating flow is employed and when the principal desideratum is that the liquid leaving the system shall contain as little of the removed impurity as possible.

In general the temperatures and conditions throughout the system should be such that no condensation of other impurities than that desired to be removed will occur and this object is generally realized by maintaining the entire system at a temperature just below the boiling point of the less volatile of the two liquids involved, namely, the liquid being treated and the absorbent liquid, and also by employing an absorbent liquid having a chemical rather than a merely physical action upon the constituent which is removed from the fresh liquid. For example, when phenol is to be removed from an ammoniacal liquor, a solution of caustic soda or similar alkali may be employed as the absorbent liquid.

The pumps 14 which are necessary because of the path followed by the absorbent liquid in traversing the scrubbing sections 3 may be of any type suitable for the handling of the absorbent liquid involved and may conveniently be replaced in many instances by air- or steam-lifts.

In the apparatus shown in Fig. 2 such pumps or lifts are not necessary as in this instance the absorbent liquid enters the uppermost scrubbing section 3 and passes downward through the remaining scrubbing sections 3 in a direction parallel to the flow of the treated liquid through the stripping sections 2. In this instance conduits 17 are provided for conducting the absorbent liquid from one scrubbing section 3 to the next lowest.

The concurrent arrangement shown in Fig. 2 is particularly advantageous when it is desired to insure that the gas leaving the tower 1 through outlet 6 will contain a minimum amount of volatilized constituent, which object is realized due to the fact that the gas about to leave the system traverses that scrubbing section 3 which is supplied with the fresh absorbent liquid.

The apparatus shown in Figs. 1 and 2 may be employed with either a single non-recirculating flow of carrier gas or with a recirculating flow of gas, but in either instance will permit the use of a much smaller flow of carrier gas than will be true if only a single stripping section and a single scrubbing section were employed. Moreover, the specific nature of the scrubbing sections and stripping sections may be varied according to the type of contact desired. As shown in Figs. 1 and 2, these sections are filled with the usual type of contact material involving contact of a large area with low back pressure, but other types of contact devices may be used, for example, bubbling trays.

It will be seen that my invention is independent of the nature of the liquid being treated, the absorbing agent or the carrier fluid. However, when it is applied to a particular problem, it will at once be apparent to those skilled in the art that it should be so adapted as to secure results consistent with other objects to be attained at the same time, and also, where possible, with the minimum of change with respect to well developed existing processes. An example of its specific application to the problem of dephenolization of ammoniacal liquor is illustrated in Fig. 3.

Referring to this view, the usual apparatus for the distillation of ammonia liquor is shown as comprising a free ammonia still 20, a lime leg 21, and a fixed ammonia still 22. As in the usual process of distillation the ammoniacal liquor is first distilled in the free ammonia still 20 for removal of volatile constituents, such as ammonia, carbon dioxide, and hydrogen sulphide, and then passes into the lime leg 21 where it is mixed with milk of lime or other chemical for the decomposition of fixed ammonia compounds, and is then steam distilled in the fixed ammonia still 22 for the removal of the ammonia originally present in fixed form. In the usual type of still, steam is principally admitted to the bottom of the fixed still and the mixture of steam and ammonia vapor passes upward through the fixed ammonia still 22, then through the free ammonia still 20, and thence to the dephlegmators and condensers or equivalent apparatus.

In the present instance, as shown in Figs. 3 and 4, the absorption tower or column 1 of the present invention may be conveniently combined with the conventional ammonia distillation apparatus by mounting it upon the fixed ammonia still 22. The column 1 shown in Figs. 3 and 4 corresponds with respect to arrangement of stripping sections 2 and scrubbing sections 3 with the apparatus shown in Fig. 1, but differs from the apparatus shown in Fig. 1 in that the various sections 2 and 3 are of the bell-and-tray type. Such sections or trays are preferably made quite deep in order to permit the passage of a large amount of steam and vapor with as little entrainment as possible, and to insure against accidental overflow of liquid from any section.

The course of the gas liquor through the unit is as follows. It enters the free ammonia still 20 through an inlet 23 and passes down through the sections or trays of the free ammonia still 20 in the usual manner. Upon reaching the bottom of the free ammonia still 20 it passes out through a conduit 24 and is forced by a pump 25 or steam lift to the uppermost stripping section 2 of the tower 1. It then passes downward through the various stripping sections 2 of the tower 1 and then through a conduit 26 into the lime leg 21 where is is mixed with milk of lime introduced through a conduit 27 in the usual manner. The lime liquor then overflows through the conduit 28 into the fixed ammonia still 22, and after passing downward through the various sections of the same, finally passes out through a drain 29 substantially completely free of ammonia and phenol.

In this instance the steam employed for the usual distillation of the ammoniacal liquor also serves as the carrier fluid for the dephenolization process. This steam enters the bottom of the fixed amomnia still 22 through an inlet 30 and passes upward through the fixed ammonia still 22, then through the alternating stripping sections 2 and scrubbing sections 3 of the dephenolizing tower 1, through a conduit 31 to the bottom of the free ammonia still 20 and upward through the same, ultimately emerging from the free ammonia still 20 through a vapor outlet 32 leading to the dephlegmators, condensers, and the like.

During this course the steam first removes the decomposed ammonia from the limed liquor, then accomplishes repeated partial dephenolization of the already partly distilled liquor and finally serves to remove the bulk of the free ammonia and the acidic impurities from the gas liquor.

Steam may also be admitted to the lime leg 21 through an inlet 33 as in the usual ammonia still.

In this instance caustic soda solution of the proper strength and temperature is employed as the absorbent liquid for the phenol and this solution is caused to traverse the scrubbing sections 3 in a series opposite to the series of stripping sections 2 traversed by the liquor being treated. A plurality of steam lifts 34 may be conveniently employed to transfer the caustic soda solution from one scrubbing section 3 to the next.

The advantage of the arrangement shown in Figs. 3 and 4 is that it provides a complete distillation of the gas liquor with respect to ammonia before it leaves the system and thus prevents loss of this valuable material. However, the arrangement shown in Figs. 3 and 4 is such that the gas traversing the dephenolizing tower 1 contains considerable quantities of ammonia. Since ammonia is known to have a slight depressing action upon the volatilization of phenols it may in some instances be desired to employ the arrangement illustrated in Fig. 5. In this instance the free ammonia still 20 is conveniently mounted upon the fixed ammonia still 22 and the dephenolizing column 1 is conveniently mounted upon the lime leg 21, although this arrangement may be varied to suit conditions.

Figure 5:
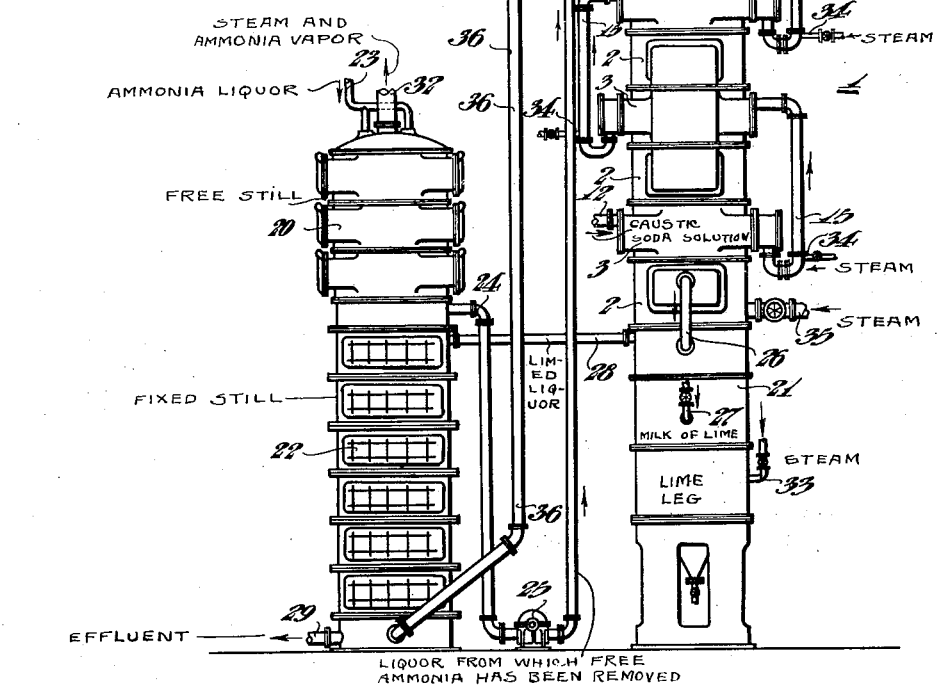
Fig. 5 is an elevational view of an ammonia still with apparatus for accomplishing the purposes of the present invention, and differing from the apparatus shown in Fig. 4 in the arrangement and disposition of its several parts.

Aside from this arrangement, the principal detail in which the apparatus in Fig. 5 differs from that of Figs. 3 and 4 is the introduction of the steam for the dephenolization and distillation operations through a conduit 35 into the bottom of the dephenolizing column 1. In this instance, the course of the steam is through the alternated stripping sections 2 and scrubbing sections 3 of the dephenolizing column 1, then through a conduit 36 to the bottom of the fixed ammonia still 22 and then through the fixed ammonia still 22 and the free ammonia still 20 in the usual manner.

Inasmuch as the liquor entering the dephenolizing column 1 through the conduit 26 has already been distilled for the removal of substantially all of its free ammonia content, it is obvious that the concentration of ammonia in the steam passing through the dephenolizing column 1 will be very low and consequently the above mentioned depressing effect upon the volatilization of phenol will be greatly reduced or entirely eliminated.

Figure 6:
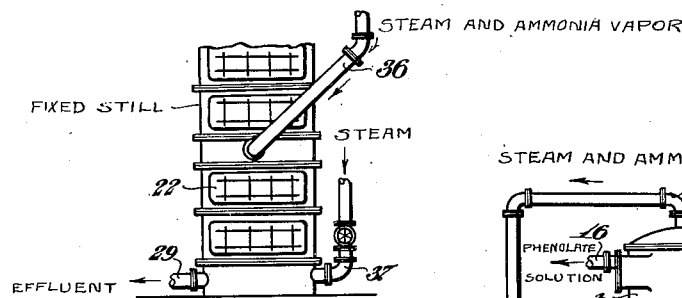
Fig. 6 is an elevational view of an alternate form of a portion of the apparatus shown in Fig. 5.

In cases where the free ammonia content of the liquor being treated is such that the steam emerging from the dephenolizing column 1 contains a considerable amount of ammonia, the apparatus shown in Fig. 6 may be employed in which the conduit 36 conducting said vapors from the dephenolizing column 1 to the fixed ammonia still 22 is introduced to the latter at a point some distance from the waste liquor outlet 29, for example, into the second or third section from the bottom of the fixed ammonia still 22. In this instance additional steam may be supplied through an inlet 37 to the bottom of the fixed ammonia still 22 in order to insure that the waste liquor is completely freed from ammonia before discharging it.

Ordinarily the preferred absorbent agent for the phenol in the dephenolizing operation is a solution of sodium hydroxide and when this is true, it is extremely desirable that the carbon dioxide originally present in the gas liquor be completely removed in the free still prior to the dephenolizing operation, as otherwise this constituent will react unfavorably with the sodium hydroxide, forming sodium carbonate. However, other absorbent liquids may be employed, for example, a suspension of lime similar to that used in the lime leg and this precaution is then no longer of such importance.

This is particularly true when the ammonia from the distillation operation is to be used for the manufacture of aqua-ammonia or when for other reasons a high purity of the vapors escaping from the still is desired. In such case the apparatus shown in Fig. 7 may be employed to advantage. It will be noted in the drawing that the free ammonia still is entirely eliminated, its place being taken by the dephenolizing column 1 constituted as before and conveniently mounted upon the lime leg 21.

In this instance the ammonia liquor to be distilled enters the uppermost stripping section 2 of the dephenolizing column 1 and passes downward through the series of stripping sections 2 in countercurrent to the steam and ammonia vapor coming from the fixed ammonia still 22. During its passage through the stripping sections 2 the ammonia originally present in volatile form as well as carbon dioxide, hydrogen sulphide and analogous impurities and also the phenol are driven off by the steam and the phenol and all or a considerable portion of the carbon dioxide and hydrogen sulphide is absorbed by the lime liquor which traverses the scrubbing sections 3.

The ammonia liquor then passes down into the lime leg 21 and through the fixed ammonia still 22 in the usual manner. While calcium phenolate is produced by this method it is done so deliberately and the resulting solution of calcium phenolate which passes out of the dephenolizing column 1 through the outlet 16 is very highly concentrated as compared to the concentration of calcium phenolate which would otherwise result in the still waste leaving the system through the drain 29. This difference in concentration enables its comparatively easy recovery or disposal.

It will be apparent from the above description that in this modification of my invention the suspension of lime employed in the scrubbing sections 3 does not come into contact with the ammonia liquor which traverses only the stripping sections 2. Consequently this suspension of lime is not subjected to reaction with the fixed ammonia compounds of the ammonia liquor and emerges through the conduit 16 substantially uncontaminated with such products as calcium chloride or calcium sulphate which are present in the effluent liquor or still waste leaving the system through the conduit 29. The material leaving the system through the conduit 16 does, however, contain, in addition to calcium phenolate, considerable quantities of calcium hydrosulphide and calcium carbonate resulting from the production of the ammonia vapors from hydrogen sulphide and carbon dioxide.

Figure 8:
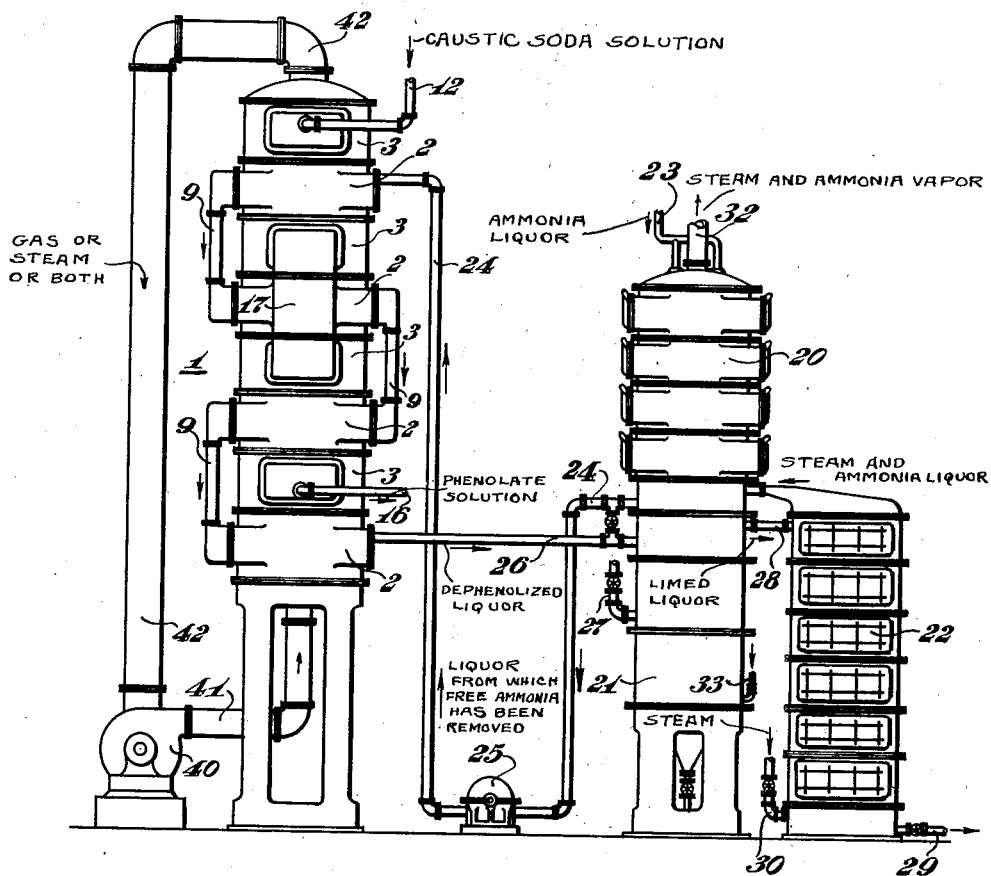

While the apparatus shown in Figs. 3, 4, 5, 6 and 7 employs as the carrier fluid the steam employed for the distillation of the liquor for removal of ammonia without recirculation, and this is made possible by means of the plurality of contacts provided by the present invention, under certain circumstances it may be advisable to employ a recirculating carrier fluid and when this is the case, the apparatus shown in Fig. 8 may be used to advantage.

In this instance the apparatus differs in two respects from that shown in Figs. 3 and 4. First, in that the dephenolizing column 1 is shown as an independent unit of construction and, second, in that the dephenolizing column 1 is entirely removed from the path of the steam used for ammonia distillation, the steam following the usual course. In its place there is provided a blower 40 and conduits 41 and 42 for recirculating a carrier fluid through the dephenolizing column 1. This carrier fluid may be any gas chemically inert with respect to the ammonia liquor and saturated with steam at the temperature of operation above set forth.

In all of the above instances the system is maintained under such conditions and such temperatures that no condensation as such takes place in the scrubbing sections 3 of the dephenolizing column 1, the action of the absorbent in these sections being merely chemical. This result is obtained by adding requisite quantities of steam directly or indirectly wherever required, as for example, to steam jackets adjacent to or surrounding the individual stages and also by insulating the apparatus to prevent loss of sensible heat.

The method herein described forms the subject matter of my copending divisional application Ser. No. 713,165, filed February 27, 1934.

It will be apparent to those skilled in the art that my invention is susceptible of various changes and combinations and that it is not limited to the specific instances hereinabove shown by way of illustrative example, but may variously be embodied and practiced within the scope of the claims hereinafter made.

I claim as my invention:

1. Apparatus for removing a volatile constituent from a liquid which comprises a tower consisting of a plurality of superimposed contact sections in two groups, the individual members of one group being located below the individual members of the other group, respectively, means for passing a gaseous fluid through the entire plurality of contact sections in the order in which they are superimposed in the tower, means for establishing a gravity flow of the liquid downward through the one of said groups in series, means for supplying an absorbent liquid to the lowermost unit of said other group, devices located between the individual units of said other group for establishing a flow of said absorbent liquid upward through the units of said other group in series, and means for removing absorbent liquid from the uppermost unit of said other group.

2. Apparatus for removal of a volatile constituent from a liquid which comprises two groups of contact units, the individual units of one group being individual to the individual units of the other group, respectively; means for passing a gaseous fluid through the contact units of said groups in series so that the gaseous fluid flows alternately through a unit of one group and then a unit of the other group in its serial flow; means for establishing a flow of liquid to be treated through the units of one of said groups, whereby portions of said constituent are transferred to said gaseous fluid, means for establishing a flow of a different liquid within the units of the other of said groups of contact units to remove the constituent absorbed by the gaseous fluid in the previous contact unit during its serial flow through said units in alternation; and means for discharging the different liquids from the units of the two groups separately from each other.

3. Apparatus for removing a volatile constituent from a liquid which comprises a plurality of contact sections in two groups, the individual sections of one group being individual to the individual sections of the other group, respectively; means for passing a gaseous fluid through the entire plurality of contact sections in series and in alternation, first a section of one group and then a section of the other group; means for establishing a flow of liquid through the sections of one of said groups in series; means for supplying an absorbent liquid to the section of the other group that is individual to the section of one of said groups at the other end of the series; devices located between the individual sections of said other group for establishing a flow of said absorbent liquid through the sections of said other group in series in the opposite direction to the direction of flow of liquid through the sections of said one of said groups, and means for removing the absorbent liquid from the section of said other of said groups that is individual to the section of said one of said groups at the beginning of its series.

MARK SHOELD.